E. W. SWARTWOUT.
STEAM MOTIVE POWER PLANT.
APPLICATION FILED MAY 22, 1917.

1,390,399.

Patented Sept. 13, 1921.
4 SHEETS—SHEET 1.

Fig. 1.

Everett W. Swartwout, Inventor
By his Attorney
Henry J. Lucke

UNITED STATES PATENT OFFICE.

EVERETT W. SWARTWOUT, OF WHITE PLAINS, NEW YORK.

STEAM-MOTIVE-POWER PLANT.

1,390,399.  Specification of Letters Patent.  Patented Sept. 13, 1921.

Application filed May 22, 1917. Serial No. 170,121.

*To all whom it may concern:*

Be it known that I, EVERETT W. SWARTWOUT, a citizen of the United States of America, residing at White Plains, Westchester county, New York, have invented certain new and useful Improvements in Steam-Motive-Power Plants, of which the following is a specification.

This invention relates to a steam power plant system.

More particularly, the invention relates to steam power plant systems for naval offensive and defensive craft of light and heavy displacements and for mercantile marine.

The invention embodies certain features of the clearance means set forth and claimed in my pending application Serial No. 101,511, filed June 3, 1916, entitled Uniflow engines and compressors. The invention embodies also certain features in steam power plant systems claimed in my pending application Serial No. 105,114, filed June 22, 1916, entitled Turbine uniflow engine system.

According to my invention, the steam power plant provides a normal cruising speed comparable to that of the regular liners and an excess or emergency speed of very wide range, even twice the normal speed. The invention provides also means for varying the speed of the ship below as well as above the normal speed and thereby enable the ship to be propelled at strategic variations of speed unattainable by motive power plants heretofore proposed.

A prime characteristic of my invention is the propulsion of the ship at normal speed at a steam consumption per B. H. P. per hour lower than the heretofore best practice has made possible and at excess speeds, at a greatly reduced steam consumption per B. H. P. per hour; in certain forms of my invention the steam consumption per B. H. P. is of approximately fifty per cent. increase over the normal. In the most preferred forms of my invention, the steam consumption at an excess or maximum speed of the ship is lower than the steam consumption of existing and prior types of engines, or combinations therewith of turbine or other power generators at similar excess or maximum speeds, notwithstanding the heretofore prevailing practice of designing motive power plants for greatest efficiency at the maximum speed of the ship propelled thereby.

In the specific embodiment of the invention described more particularly hereinafter, the design has been chosen especially for naval uses, in which uses minimum weight, height, width and length of engine plant, and wide latitude in overload capacities for the various speeds are of first importance. In such specific embodiments, the engine units have been chosen of the vertical, double acting uniflow engine type, and preferably mounted on a common support and driving a common engine shaft. For purposes of simplification and standardization of manufacture of parts and assembly, such uniflow cylinders are constructed of duplicated cylinders, pistons, inlet and exhaust parts, connecting rods, piston rods, cross heads, frames, etc. As a simplified form of operation of such specific embodiments of the invention, under normal cruising speed conditions one cylinder is operated as the high pressure cylinder and three cylinders are operated in parallel as the low pressure cylinders, such high pressure cylinder exhausting into a receiver (to eliminate pulsations), from which receiver the steam is led through a superheater, thence to the inlets of the low pressure cylinders and exhausted therefrom, preferably into a common condenser. Under excessive speed conditions the steam is led from the boiler directly through the superheater and thence into all four cylinders now operating at common initial and terminal pressures, and preferably exhausting into a common condenser.

Other features and objects of the invention will be more fully understood from the following description and the accompanying drawings, in which—

Figure 1:
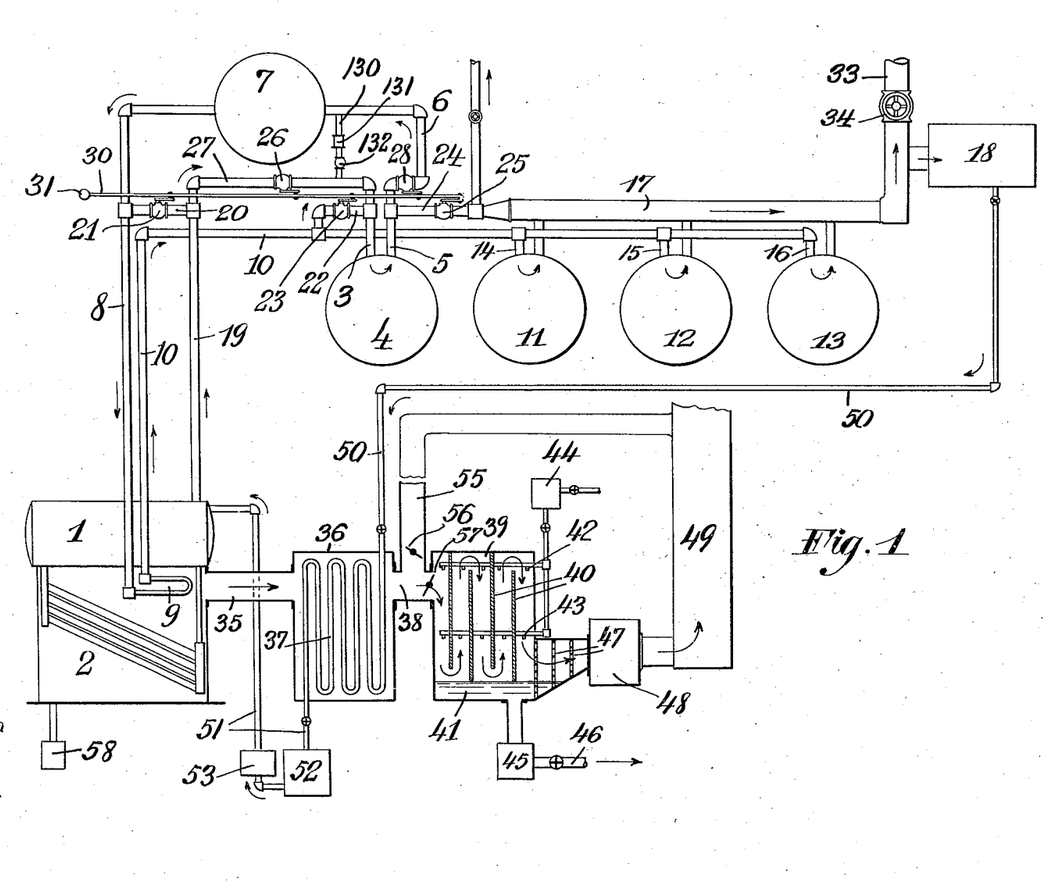
Figure 1 shows diagrammatically an embodiment of the invention comprising four uniflow cylinders.

Referring to Fig. 1, the particular arrangement comprises generally a high pressure unit, a low pressure unit, and means for supplying steam to said units in a certain relationship to one another for operation under normal conditions, combined with means for supplying steam to said units in a different relationship to one another for operation under excess or emergency conditions.

More specifically, the said embodiment shown in Fig. 1 includes the boiler 1 heated by the furnace 2, the boiler being preferably of the approved modern high pressure type. The steam line 19 leads from the boiler 1 to the intake 3 of the high pressure unit 4. The exhaust 5 of the high pressure unit 4 discharges through the piping 6 into the receiver 7 and thence through piping 8 into the superheater 9; thence through piping 10 into the low pressure units 11, 12, 13, preferably in parallel. For such purposes, the piping 10 is shown connected by the lead 14 to the inlet of the low pressure unit 11, by the lead 15 to the inlet of low pressure unit 12, and by the lead 16 to the inlet of low pressure unit 13. Preferably, also, said low pressure units 11, 12, 13 exhaust into a common exhaust header 17 communicating preferably with a condenser 18.

Under such arrangement of the aforesaid units, normal operation is effected by driving the unit 4 as the high pressure unit by steam led directly from the boiler and by driving the units 11, 12, 13 in parallel as the low pressure units by superheated exhaust steam from said high pressure unit 4.

The provision of the receiver 7 is for the purpose of eliminating pulsations in the steam supplied to the units 11, 12, 13, but said receiver may be eliminated under certain circumstances of operation.

Under excess or emergency speed conditions, the aforesaid units are preferably operated under conditions of common initial and terminal pressures. To this end, I have shown steam supplying means adapted to supply the aforesaid four units with steam led directly from the boiler and supplied to said units in parallel, with the provision of common exhaust means of all four units. As one form of operation under the aforesaid conditions, I have provided the pipe 20, having the shut-off valve 21, and connecting the steam line 19 with the steam line 8, thus leading the steam from steam line 19 directly through superheater 9, thence through piping 10, thence through piping 22, having the shut-off valve 23, and finally simultaneously into inlet 3 of unit 4, inlet 14 of unit 11, inlet 15 of unit 12 and inlet 16 of unit 13; while the exhaust 5 of unit 4 is led through piping 24, having the shut-off valve 25, directly into the exhaust header 17, now serving as the common exhaust means for said units 11, 12 and 13, as well as said unit 4.

Under such excess or emergency speed conditions, the valve 26 in piping 27 of steam line 19 is in closed position and the valve 28 in the exhaust piping 6 is also in closed position. For the purpose of simplification and readiness of the operation, I have indicated the common lever bar 30, having the handhold 31, whereby the aforesaid valves are moved simultaneously to their proper positions for varying the course of the steam to the respective units, thereby varying the relation of operation of said units to one another.

As shown in Fig. 1, the aforesaid valves are in the position for operating the unit 4 as the high pressure unit and the units 11, 12, 13 as the low pressure units, and in such relation, the valve 21 is closed, the valve 26 is open, the valve 23 is closed, the valve 28 is open and the valve 25 is closed. By moving the lever 30 to the left as viewed facing Fig. 1, the valves will then be operated to attain excess or emergency operation, in which relation the valve 21 is open, the valve 26 is closed, the valve 23 is open, the valve 28 is closed and the valve 25 is open.

The aforesaid particular arrangement represents a simplified form comprising a single unit operating normally as the high pressure unit, and three units operating normally as low pressure units, although the number and relative arrangement of such high pressure and low pressure units may be modified, as more particularly described in my above referred to application Serial No. 105,114. The use of three normally low pressure units coacting with a single normally high pressure unit is advantageous under certain circumstances of use, particularly in marine power plants.

If desired, the common exhaust 17 communicating through the piping 33, having the shut-off valve 34, with the atmosphere or other suitable exhaust terminal means, may also be provided.

An advantageous form of the aforesaid four unit embodiment is shown in Figs. 2, 3, 4 and 5, and for marine power plant purposes preferably of the vertical, double acting, uniflow type mounted on a common support and driving a common engine shaft. In this embodiment, standardization and interchangeability of parts is an important consideration.

Figure 2:
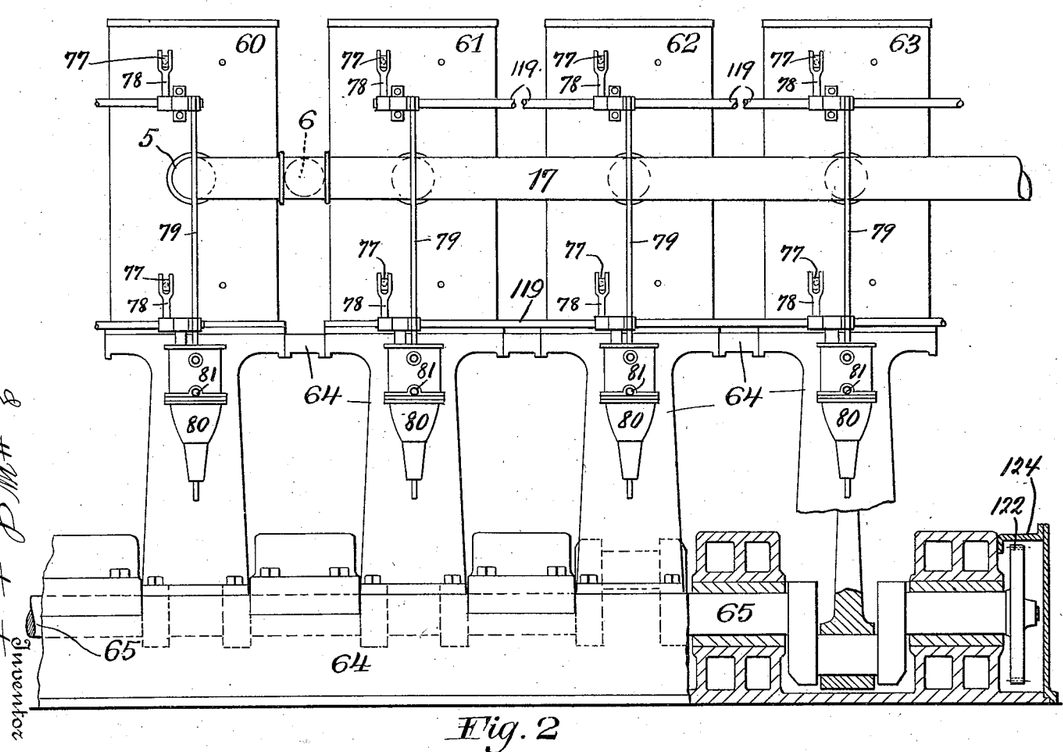
Fig. 2 is a side elevation of a specific form of four uniflow cylinders, corresponding to the aforesaid four uniflow cylinders indicated in Fig. 1.
Figures 3, 4, 6, 7:
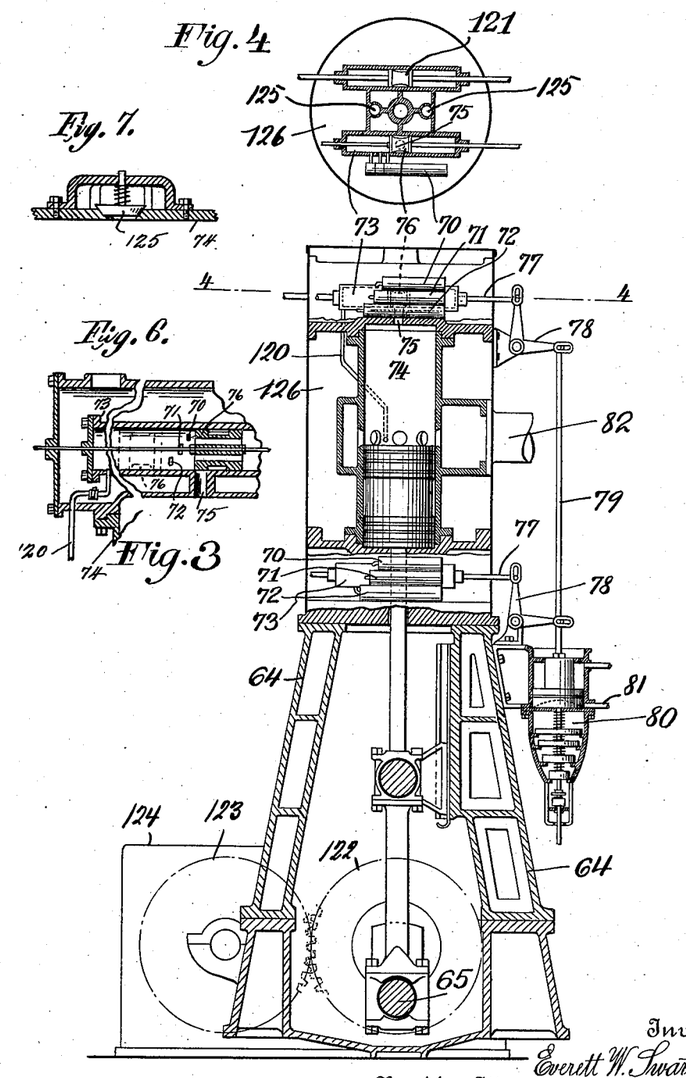
Fig. 3 is a central vertical section of one uniflow cylinder shown in Fig. 2.
Fig. 4 is a detail horizontal section on line 4—4 of Fig. 3.
Figs. 6 and 7 are detail vertical sectional views showing a main supplemental clearance on an enlarged scale and an emergency relief valve, also on an enlarged scale.

In the embodiment shown in Figs. 2, 3 and 4, the normally high pressure unit is indicated by the uniflow cylinder 60 and the three normally low pressure units are indicated at 61, 62, 63 mounted on the common frame 64 and driving the common engine shaft 65. Preferably, the normally high pressure unit 60 is most closely adjacent to the screw or propeller end of engine shaft 65, the position of the normally high pressure unit, however, being variable relatively to the normally low pressure unit or units as may be desired. The respective uniflow cylinders are constructed of uniform length, diameter of cylinder, exhaust ports, and passages, pistons, connecting rods, piston rods, cross heads and crank arms. The crank shaft is preferably arranged to effect balancing of the driving cranks, and in the particular instance of four cylinders the said cranks are arranged at 90 degrees to one another; the angular relation of the several cranks of the driving shaft is subject to choice determined by particular circumstances of use, as will be understood by the art.

The frame is also constructed of interchangeable connecting parts and the shaft bearing and journal parts of interchangeable parts. Such arrangement affords manufacture on a large basis for as wide range as desired of rated power requirements by the mere addition of high pressure or low pressure cylinder units, or both. Thus by once designing a 50 h. p. cylinder unit and a 250 h. p. cylinder unit, built-up power plants of rated horse-powers of 50, 100, 150, 200, 250, 500, 750, etc. are available.

The cylinders are provided with clearance chambers having the characteristics described and set forth in my aforesaid pending application Serial No. 101,511.

In the most preferred form of the invention set forth in my aforesaid copending application, Serial No. 101,511, supplemental clearance means are provided for the respective heads of the cylinder and coacting with the respective normal clearance spaces of the cylinder and automatically controlled to preclude the maximum compressional pressure of the steam within the cylinder in excess of the initial pressure of the steam. In the particular embodiment shown herein, the clearance chambers comprise three auxiliary clearances designated 70, 71, 72, arranged in suitable relation to the main clearance 73, the last named being connected with the cylinder 74 through the port 75 at the respective ends of said cylinder 74 similarly as shown in the aforesaid pending application Serial No. 101,511. Also, each piston valve 76 controlling the respective main clearance chambers 73 and the respective sets of three auxiliary clearance chambers 70, 71, 72, is similar in construction and operation to the piston valve shown in my aforesaid application Serial No. 101,511.

For simplicity in construction and operation, I have indicated in the present invention, the said piston valve 76 controlled by the arm 77 extending vertically slightly beyond the cylinder unit and positively operated by the bell crank 78. It will be noted that the two bell cranks 78 may be jointly operated by the common link 79.

The clearance controlling device 80 is similar in construction and operation to the corresponding clearance controlling device shown in my aforesaid application Serial No. 101,511. The passage 81 is connected under suitable control with the exhaust passage 82 of the cylinder. In said application I have set forth a clearance device comprising a main chamber having a determined clearance value and supplemental chambers of determined clearance values, usually increasing in clearance values, such supplemental chambers communicating with the main chamber and a valve controlling the openings of communication of the respective supplemental chambers with the main chamber, such valve being controlled by a pressure device in turn controlled by the initial pressure of the steam supply and the exhaust pressure of the engine.

Figure 5:
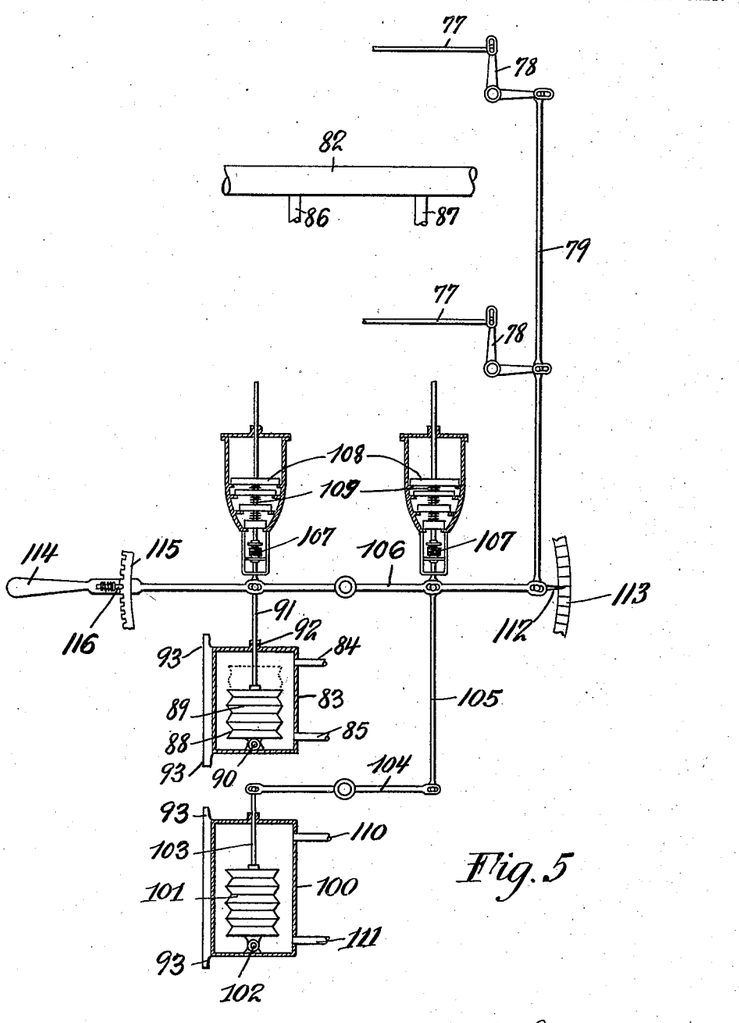
Fig. 5 is a central longitudinal sectional detail.

In Fig. 5, I have indicated an alternative construction of clearance controlling device comprising a hollow casing 83 having ports 84, 85, connected by piping to spaced points of connection 86, 87 with the exhaust passage 82, to insure sufficient circulation of the exhaust steam through said casing 83. Within said casing 83 is disposed the thermo-responsive element 88 of self-collapsible sides containing suitable material 89 responsive in volume or pressure or both to changes in temperature. Said thermo-responsive element 88 is anchored at one end at 90 to the casing 83, and at the other end attached to the rod 91 passing through the pocketed opening 92 and controlling the aforesaid piston valves 76 of the clearance chambers, as by connecting said rod 91 to bell cranks 78 by means of the said link 79. The casing 83 is provided with lugs 93 adapted to support the casing 83 on brackets at the side of the cylinder unit, similar to the mounting of the clearance controlling device 80 shown in Fig. 3.

Thus upon variation in temperature of the exhaust steam, similar to variation in pressure of the exhaust steam as described in said pending application Serial No. 101,511, said thermo responsive element 88 will be increased in effective length (as indicated by dotted lines in Fig. 5) upon increase in temperature, i. e., upon decrease in vacuum or increase in absolute gage pressure, and the piston valve 76 moved to bring one or more clearances into effective communication with the clearance proper of the cylinder. Similarly, upon decrease in exhaust temperature, i. e., increase in vacuum or decrease in absolute gage pressure, the thermo-responsive element 88 will be decreased in effective length and draw the rod 91 downwardly to decrease the effective clearance. Preferably such thermo-responsive device is provided also to be controlled by the temperature of the initial steam and the piston valve 76 of the clearance device controlled by the differential effect of the exhaust thermo-responsive device and the initial steam thermo-responsive device, as indicated in Fig. 5. In such arrangement, the initial steam thermo-responsive device 100 is similarly provided with the thermo-responsive element 101, anchored at 102, and connected with rod 103, controlling said link 79 by means of the lever 104, link 105 and main lever 106, to the last-named of which said rod 91 of the exhaust thermo-responsive device 83 is also connected. Suitable springs 107 and sets of counter-balancing weights 108 and intermediate springs 109 are arranged for the respective exhaust and initial steam thermo-responsive devices, similar to correspondingly designated elements shown in Fig. 4, and more fully described in my said copending application Serial No. 101,511. The ports 110, 111 of the initial steam thermo-responsive device 100 are connected at suitable, spaced points of connection with the steam line to provide ample circulation of the initial steam in the casing 100 to register the temperature changes of the same.

From the above, it will be noted that under the condition of minimum vacuum, the differential piston of the control device 80 is in its lowermost position, as indicated in Fig. 3, and that each perforated valve 76 at the respective heads of each cylinder is in its position of closure of the passage 75 between each main supplemental clearance chamber 73 and the interior of its cylinder, as indicated in Fig. 3 and shown enlarged in Fig. 6. Under the condition of lesser vacuum, the differential piston of the control device 80 is elevated, thereby moving the respective perforated valves 76 in their respective main supplemental clearance chambers 73 to the successive stages of, firstly, communication of the normal clearance of each cylinder with its pair of main supplemental clearance chambers 73; or, secondly, the communication of the normal clearance of each cylinder with its pair of main supplemental clearance chambers 73 and the first additional supplemental clearance chambers 70; or, thirdly, the communication of the normal clearance of each cylinder with its pair of main supplemental clearance chambers 73, the first additional supplemental clearance chambers 70 and the second additional supplemental clearance chambers 71; or, fourthly, the communication of the normal clearance of each cylinder with its pair of main supplemental clearance chambers 73, the first additional supplemental clearance chambers 70, the second additional supplemental clearance chambers 71 and the third additional supplemental clearance chambers 72; and so on for such additional clearance chambers as may be employed, at each stage providing for a total clearance space together with the normal clearance space of each cylinder to preclude rise of the compressional pressure therein, i. e., the maximum compressional pressure of the cylinder in excess of the initial steam pressure. The extreme position of the perforated valve 76 is indicated by dotted outline in Fig. 6. During such progressive stage of movement of the differential piston of the control device 80, the weights of the control device 80 are successively raised to thereby increase progressively the counterbalancing effect of such weights on the displacing forces acting upon the differential piston of the controlling device 80. Similarly, upon progressive or other variations of increase of vacuum, the perforated valve 76 is moved toward its position shown in full outline in Fig. 6, to successively cut out the respective additional clearance chambers 72, 71, 70 in the order named and finally the main supplemental clearance chamber 73.

In such particular forms of my variable clearance means, the clearance means is varied to maintain the compressional pressure of the steam within the respective cylinders at substantially uniform pressure, and at all times not in excess of the initial pressure of the steam lead into the respective cylinders.

An indicator may be employed comprising pointer 112 and scale 113 bearing indications of the number or effective value of the clearance or other correlative marking. The main lever 106 may also be provided with the hand hold 114 and notched segment 115 and spring pressed pawl 116, the latter being capable of being manually pushed into non-operating position when the differential control is automatically effected.

Preferably, the normally high pressure unit 60 is provided with an individual clearance controlling device 80 and the three normally low pressure units 61, 62, 63, operated by a common clearance controlling device, the upper and lower sets of bell cranks 78 in such case being respectively fixedly mounted on the common shafts 119. If desired, individual clearance controlling devices may be provided for the respective normally low presure units 61, 62, 63 whereby the effective clearance for the respective limits 61, 62, 63, is controlled individually, under which circumstances the shaft 119 is omitted.

As indicated in Fig. 4, the inlets at both ends of the respective uniflow cylinders are controlled by any approved steam inlet valve 121 operated from any gearing driven by the gear 122 mounted on engine shaft 65, and driving gear 123. Said gear 123 is preferably inclosed in a casing 124 extending laterally at the bottom of the engine frame 64 and the gear 123 and gear 122 submerged in lubricant. As shown in Fig. 1, the bypass 130 may be connected between the initial steam line 2—27 and the receiver intake piping 6 and provided with the pressure reducing valve 131 and shut-off or check valve 132, similar to the corresponding arrangement described in my said co-pending application Serial No. 105,114.

Each cylinder at its head and frame end may also be provided with emergency relief valves 125, and the head and frame ends of each cylinder jacketed with a steam jacket 126, similar to my aforesaid application Serial No. 101,511.

A primary advantage of the several forms of my invention is the low steam consumption per B. H. P. per hour effected by the intermediate superheating between the one or more normally high pressure units and the one or more normally low pressure units. Such superheating is carried out at comparatively low temperature and reduces the heat losses through the flue gases. Also, under conditions of normal speed and load, the superheaters have the capacity to superheat at a maximum and the quality of the steam exhausted from the normally high pressure unit is relatively greatly improved by such superheating. Under excess or emergency conditions the boilers are required to produce maximum power output, in which case the steam passes directly through the superheater prior to entering any cylinder, and whereas the relative superheating diminishes under this condition, the maximum benefit in the quality of the steam is developed without excess of temperature of the steam at the inlets of the cylinders.

For the purpose of eliminating possible excess pressure in any clearance compartment, a pipe 120 may be employed to connect such clearance compartment, either main or supplemental, with the interior of the cylinder, as indicated in Fig. 3.

A simple form of this feature of my invention embodies such pipe 120 connected to each of the two main clearance compartments 73 of a cylinder, whereby upon exhausting such pipes 120 respectively into the exhaust passage 82 of the cylinder, passage is afforded from the respective main clearance compartments into the exhaust, thereby relieving undue or excessive pressure of steam therein. Such relation of connection of any supplemental clearance compartment with the exhaust of the cylinder by a similar pipe 120 affords similarly relief against undue or excessive pressure in such supplemental clearance compartment; however, for simplicity and in view of the communication between each supplemental clearance compartment, and associated main clearance compartment, such pipe 120 may be solely connected to the main clearance compartments. By virtue of the employment of the said pipes 120, the clearance compartments are disposed between the inlet region and the exhaust region of the cylinder and serving under conditions of operation to afford passage of the steam from the clearance means directly to the exhaust region, as well as through the interior of the cylinder. As is fully disclosed in my aforesaid pending application Serial No. 101,511, the clearance means is preferably surrounded by live steam supplied from the inlet at each end of the cylinder.

Under conditions of light load, the cut-off of the steam inlet valve is retarded, with consequent low combined mean effective pressure. Even under the smallest frictional loads over-expansion in any cylinder is impossible.

Under condition of operation of all cylinders at common initial and terminal pressure, upon advancing the cut-off of the inlet valves as desired, the mean effective pressure is consequently increased in each cylinder with resultant maximum over-load capacity. In the ordinary triple expansion engine, the maximum over-load capacity will be developed only with the introduction of receiver pressures higher than normal, the maximum limit of over-load being limited by the maximum displacement of the high pressure piston.

Solid, liquid or other character of fuel may be employed for heating the water coils in the fire box. An improved advantage of the invention as applied to naval use is the marked decrease in fuel consumption, thereby decreasing the required fuel storage space, increasing the cruising radius of the vessel and consequent other benefits.

It will be understood that for the condition of smaller variation in the range of speed, I may employ uniflow cylinders, all duplicate in general dimensions, and operated solely in compound relation, thereby effecting simplification of construction and arrangement, but attendant with more or less loss in efficiency as compared with the more efficient forms of my invention set forth herein.

Whereas I have described my invention by reference to specific forms thereof, it will be understood that many changes and modifications may be made without departing from the spirit of the invention.

I claim—

1. The combination with steam supplying means, of a uniflow engine comprising a plurality of cylinders, each cylinder being provided with a piston, inlet and exhaust means and a normal clearance space, variable supplemental clearance means for said cylinders, means connecting said steam supplying means and said cylinders for operating one of said cylinders at high pressure and the remainder of said cylinders at low pressure and means connecting said steam supplying means and said cylinders for operating all of said cylinders at uniform pressure.

2. The combination with steam supplying means, of a uniflow engine comprising a plurality of cylinders, each cylinder being provided with a piston, inlet and exhaust means and a normal clearance space, means connecting said steam supplying means and said cylinders for operating one of said cylinders at high pressure and the remainder of said cylinders at low pressure, means connecting said steam supplying means and said cylinders to operate all of said cylinders at substantially uniform pressure and means for precluding the rise of the compressional pressure within said cylinders in excess of the initial steam pressure.

3. The combination with steam supplying means, of a uniflow engine unit constructed to be normally operated at relatively high pressure, steam passage means connecting said supplying means with the inlet of said unit, a superheater connected with the exhaust of said unit, a second unit, the inlet of said second named unit being connected with said superheater, clearance means for said second unit, means for operating said units at substantially uniform pressure and means for varying said clearance means.

4. The combination with steam supplying means, of a uniflow engine unit constructed to be normally operated at relatively high initial pressure, steam passage means connecting said supplying means with the inlet of said unit, a superheater connected with the exhaust of said unit, a second unit, the inlet of said second named unit being connected with said superheater, clearance means for said second unit means for operating said units at substantially uniform initial and terminal pressures and pressure responsive means for varying said clearance means.

5. The combination with steam supplying means, of a uniflow engine comprising a normally high pressure unit, a plurality of normally low pressure units, clearance means for said plurality of units; passage means connecting said supplying means with said high pressure unit and the exhaust of said high pressure unit with said plurality of units, means for varying said clearance means, means for operating said units at substantially the same initial pressure.

6. The combination with steam supplying means, of a normally high pressure uniflow unit, a plurality of low pressure uniflow units, all said units having substantially similar cylinders, passage means connecting said supplying means with the inlet of said high pressure uniflow unit, a superheater connected with the exhaust of said high pressure uniflow unit, clearance means for said plurality of normally low pressure units, means for varying said clearance means, the inlets of said second named units being respectively connected with said superheater and means for operating said high pressure uniflow unit and said plurality of low pressure uniflow units at substantially uniform initial and terminal pressures.

7. The combination with steam supplying means, of a uniflow engine comprising a normally high pressure unit, a plurality of normally low pressure units, all said units having substantially equivalent cylinders and pistons, passage means connecting said supplying means with said units, supplemental clearance means for said plurality of normally low pressure units, pressure responsive means for varying said supplemental clearance means and means for operating said units at substantially the same initial pressure.

8. The combination with steam supplying means, of a uniflow engine comprising a normally high pressure unit, a plurality of normally low pressure units, all said units having substantially equivalent cylinders and inlets and exhausts, a common shaft operated by said high pressure and low pressure units, passage means connecting said supplying means with said units, supplemental clearance means for said plurality of normally low pressure units, pressure responsive means for varying said supplemental clearance means, and means for operating said units at substantially the same initial pressure.

9. The combination with steam supplying means, of a uniflow engine comprising a normally high pressure unit, a plurality of normally low pressure units, said units being of equivalent construction, passage means connecting said supplying means with said units, supplemental clearance means for said plurality of normally low pressure units, means for varying said supplemental clearance means to preclude rise of compressional pressure in excess of the initial steam pressure, and means for operating said units at substantially the same initial pressure.

10. The combination with steam supplying means, of a normally high pressure unit, a plurality of normally low pressure units, said units being of the uniflow type, passage means connecting said supplying means with said units, clearance means for said plurality of units, means for varying said clearance means, and means for operating said units at substantially the same initial pressure.

11. The combination with steam supplying means, of a uniflow engine comprising a unit constructed to be normally operated at relatively high steam pressure, a unit constructed to be normally operated at relatively low steam pressure, variable clearance means for said second-named unit, means for varying said clearance means, a shaft driven in common by said units, passage means connecting said steam supplying means and said units for operating said units at will in series or in multiple and means for precluding compressional pressure of the steam within said high pressure unit and said low pressure unit in excess of the initial steam pressure.

12. The combination of means for supplying steam at a substantially constant initial pressure, a uniflow engine comprising a unit constructed to be normally operated at relatively high steam pressure, a unit constructed to be normally operated at relatively low steam pressure, a common support for said units, variable clearance means for said second-named unit, means for varying said clearance means, a shaft operated in common by said units, passage means connecting said steam supplying means and said units for operating said units at will in series or in multiple and means for precluding rise of compressional pressure of the steam within both of said units in excess of said substantially constant initial pressure.

13. The combination of a uniflow unit constructed to be normally operated at relatively high steam pressure, a uniflow unit constructed to be normally operated at relatively low steam pressure, a common support for said units, steam passage means connecting said uniflow units at will in series or in multiple, supplemental clearance means for said uniflow units, means for varying said supplemental clearance means to maintain the maximum compressional pressure of the steam substantially uniform, a shaft operated in common by said units, and means for improving the quality of the steam exhausted from said first-named unit and for leading the resultant steam into said second named unit.

14. The combination with steam supplying means, of a uniflow engine comprising a plurality of steam operated units, one or more of said units comprising variable clearance means, means connecting said supply and said units for operating said units in series, means for connecting said units in multiple and means for varying said clearance means.

15. The combination with steam supplying means, of a uniflow engine comprising a plurality of steam operated units, one or more of said units comprising variable clearance means, means connecting said supply and said units for operating said units in series, means for connecting said units in multiple and means responsive to the pressure of the steam for varying said clearance means.

16. The combination with steam supplying means, of a uniflow engine comprising a plurality of steam operated units, one or more of said units comprising variable supplemental clearance means, passage means connecting said supply means and said units, means controlling said passage means for connecting at will said units in series or in multiple and means for varying said supplemental clearance means to maintain the maximum compressional pressures of the steam within said units respectively substantially constant.

17. The combination with steam supplying means, of a uniflow engine comprising a plurality of steam operated units, one or more of said units comprising variable supplemental clearance means, passage means connecting said supply means and said units, means controlling said passage means for connecting at will said units in series or in multiple and means responsive to the pressure of the steam for varying said supplemental clearance means to preclude rise of the maximum compressional pressure of the steam within said units in excess of the initial steam pressures of said units respectively.

18. The combination of a uniflow device, clearance means and means responsive to exhaust temperature variations for controlling the communication of said clearance with the clearance proper of said device.

19. The combination of a uniflow device, clearance means and means responsive to combined initial steam and exhaust temperature variations for controlling the communication of said clearance with the clearance proper of said device.

20. The combination of a uniflow device, clearance means and differential means responsive to exhaust temperature variations for controlling the communication of said clearance with the clearance proper of said device.

21. The combination of a uniflow cylinder, sets of clearance means for the head and frame ends respectively of the cylinder and common means controlling the communication of said sets of clearance means with the clearance proper of the cylinder.

22. The combination of a uniflow cylinder, sets of clearance means for the head and frame ends respectively of the cylinder and common means responsive to a certain exhaust condition controlling the communication of said sets of clearance means with the clearance proper of the cylinder.

23. The combination of a uniflow engine comprising a cylinder, clearance means, passage means for affording communication between said clearance means and the clearance proper in the cylinder of said engine, and means responsive to the exhaust temperature variations for controlling the communication of said clearance means through said passage means with the clearance proper of said engine, said responsive means comprising a supplemental clearance chamber, and means independently of said passage means connecting the interior of said supplemental clearance chamber with the interior of the cylinder of said uniflow engine.

24. The combination of a uniflow engine comprising a cylinder, clearance means, passage means for affording communication between said clearance means and the clearance proper in the cylinder of said engine, and means responsive to the exhaust temperature variations for controlling the communication of said clearance means through said passage means with the clearance proper of said engine, said responsive means comprising a supplemental clearance chamber, and passage means independently of said first-named passage means connecting the interior of said supplemental clearance chamber with the interior of the cylinder of said uniflow engine closely proximate the exhaust belt of said cylinder.

In testimony whereof I have signed this specification this 17th day of May, 1917.

EVERETT W. SWARTWOUT.